A. B. Latta,
Steam Safety Valve.
Nº 14,963.      Patented May 27, 1856.
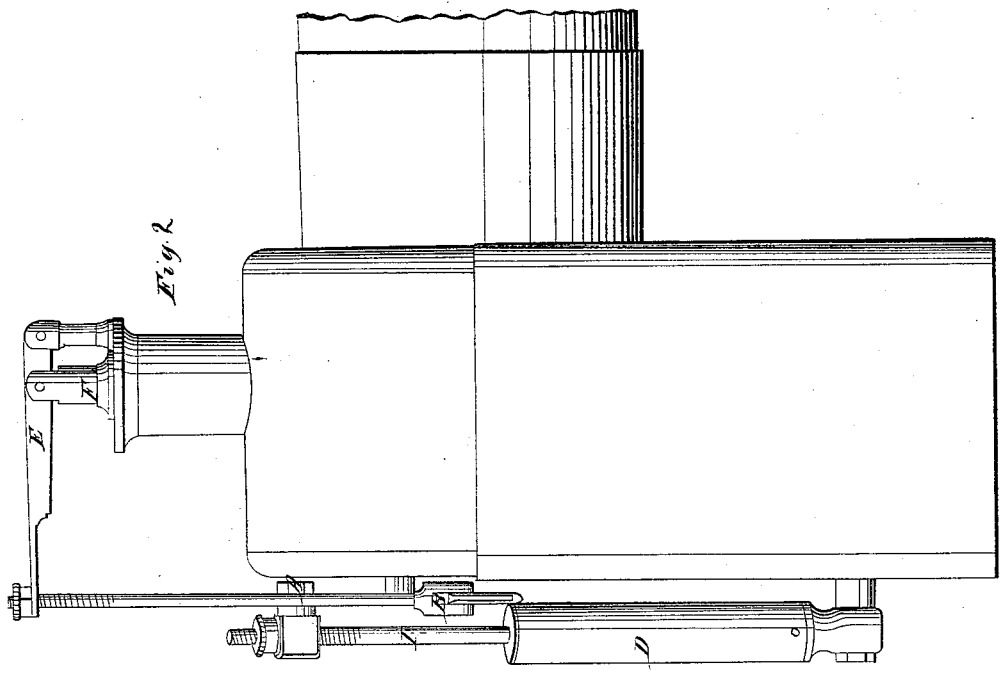
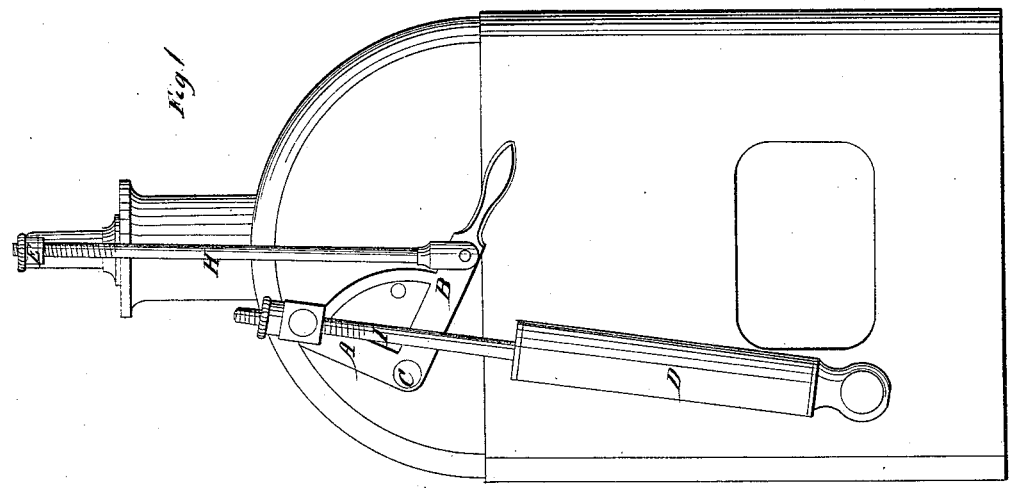

UNITED STATES PATENT OFFICE.

A. B. LATTA, OF CINCINNATI, OHIO.

SAFETY-VALVE FOR STEAM-ENGINES.

Specification of Letters Patent No. 14,963, dated May 27, 1856.

*To all whom it may concern:*

Be it known that I, ALEXANDER B. LATTA, of Cincinnati, in the county of Hamilton and State of Ohio, have invented a new and useful improvement which I denominate an "Improvement in Attaching Spring-Balances to Safety-Valve Levers," which is described as follows, reference being had to the annexed drawings of the same, making part of this specification.

The object of this improvement is to relieve the safety valve, when steam is sufficiently high to blow off, without increasing the pressure.

It is a known fact that all valves such as those used on locomotives that are held down by a spring balance, that the pressure increases when the valve raises, because raising the lever draws up the spring farther, which increases the number of pounds exerted on the lever consequently it increases the pressure of steam, besides, the valve when raised from the seat has not the same resistance in as much as the opening between the valve and seat, allows the steam to escape, consequently it is not confined at that point, and the higher the valve is raised off the seat, the less power the steam has to raise it. These two causes, namely, the valve leaving the seat, and the spring balance increasing, are the reasons why the pressure increases beyond the number of pounds the valve may be set at. It is important that the valve should never allow any more steam to accumulate than the boiler is allowed to carry.

The following is a description of this improvement, to relieve the boiler of an excess of pressure, like letters referring to like parts, &c. First: In Figure I is an end view of a locomotive boiler.

A, B, are two cranks; both are fast together at C at which point they move on a stud, or pin screwed into the end of the boiler, from A to B a segment is cast to strengthen them, by way of a brace at the lower end. B is a handle cast on it to raise it with. It will be seen that those cranks stand nearly at an angle of 45 deg. This however may be set in various positions, by adjusting the screws which reach from A to the spring balance D, and the screw rod, which leads from crank B, to the end of the safety valve lever E. However, at 45 deg., or near there, is the best position. The screw I which leads to the spring balance must be screwed up sufficiently tight, to create power enough to hold the lever down, which will be 5 or 6 times as much weight as will hold the lever if exerted directly on it. This depends upon the position of the cranks A, B. The nearer crank A is to perpendicular line, the more power, it requires on the spring balance, and the less it exerts on the lever. This is the reason, why, it gets lighter on the lever, when the steam raises it. The spring balance in this arrangement moves very little; for that reason, it makes no difference, whether a common straight spring or an elliptic, or any other form of spring is used, when the spring balance is used, as in this case. Fig. II is a side elevation of this boiler. It is broken off just forward the fire box.

E represents the safety valve lever, F the safety valve, A B the cranks, B the spring balance, I, H, the screw rods which connect spring and lever together. By screwing down the nuts on those rods I, H, the desired amount of power may be exerted on the lever which will be shown by the steam gage.

It must be observed that the crank A, to which the spring balance is attached, as it approaches a perpendicular position, the power required to hold it must be increased at the same time the crank B is nearing a horizontal line which gives the safety valve, the advantage over the spring balance and vice versa. In this way the lever is allowed to raise without increasing the power thereby.

This improvement has been applied to the locomotive, and the steam fire engine, and found to work to perfection.

It must be remembered that when no steam gage is employed on the boiler, to which this improvement is applied in order to ascertain the number of pounds exerted on the lever at all times, it will be necessary to use a common spring balance, in the room of rod H so as to indicate the number of pounds on the lever, regardless of the position of the cranks. This is necessary, because, screwing the nuts up or down alters the position of the cranks, and consequently the power, but when a steam gage is employed, the position of the cranks can at any moment be adjusted, to suit the steam gage so as to blow off, at any desired point of pressure.

What I claim as my invention and desire to secure by Letters Patent, is—

The mechanical means herein described, for the purposes set forth, or any equivalent arrangement.

A. B. LATTA.

Witnesses:
W. CHEDSEY,
C. S. GOANEY.